(12) United States Patent
Nishimiya

(10) Patent No.: US 11,141,798 B2
(45) Date of Patent: Oct. 12, 2021

(54) CHUCK AND METHOD FOR MANUFACTURING SAME

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Fuchu (JP)

( * ) Notice: Subject to any disclaimer, the term of this patent is extended or adjusted under 35 U.S.C. 154(b) by 0 days.

(21) Appl. No.: 16/768,679

(22) PCT Filed: Nov. 14, 2018

(86) PCT No.: PCT/JP2018/042055
§ 371 (c)(1),
(2) Date: May 31, 2020

(87) PCT Pub. No.: WO2019/107142
PCT Pub. Date: Jun. 6, 2019

(65) Prior Publication Data
US 2021/0187627 A1 Jun. 24, 2021

(30) Foreign Application Priority Data
Dec. 1, 2017 (JP) .............................. JP2017-232082

(51) Int. Cl.
*B23B 31/177* (2006.01)
(52) U.S. Cl.
CPC .. *B23B 31/16241* (2013.01); *B23B 31/16233* (2013.01); *B23B 31/16245* (2013.01); *Y10T 279/1973* (2015.01)

(58) Field of Classification Search
CPC ........ B23B 31/16233; B23B 31/16237; B23B 31/16241; Y10T 279/1973
See application file for complete search history.

(56) References Cited

U.S. PATENT DOCUMENTS

| | | | | |
|---|---|---|---|---|
| 4,300,780 | A | * 11/1981 | Urbanic | ............ B23B 31/16179 279/121 |
| 4,362,306 | A | * 12/1982 | Rohm | ............... B23B 31/16245 279/121 |
| 4,410,192 | A | * 10/1983 | Nobukawa | ........ B23B 31/16266 279/121 |
| 5,842,703 | A | * 12/1998 | Antoni | .............. B23B 31/16233 279/123 |

(Continued)

FOREIGN PATENT DOCUMENTS

| | | |
|---|---|---|
| DE | 10049070 A1 | 5/2002 |
| GB | 2067933 A | 8/1981 |

(Continued)

*Primary Examiner* — Eric A. Gates
(74) *Attorney, Agent, or Firm* — Maschoff Brennan

(57) ABSTRACT

A chuck includes a plurality of master jaws 20 that slide in the radial direction in the front surface of a body 10 in conjunction with slide of a plunger 40. The body 10 has a housing chamber 11 communicating with a plurality of keyways 13. The plunger 40 is fitted in the housing chamber 11. Each of the master jaws 20 includes a narrower part 21 and a wider part 22 fitted into an associated one of the keyways 13, and a wedge 23 connected to the plunger 40. The wider part 22 has a flat wider sliding surface 22*b* radially outside the wedge 23. Each of the keyways 13 has a wider slid surface 14.

5 Claims, 12 Drawing Sheets

(56) References Cited

U.S. PATENT DOCUMENTS

| | | | |
|---|---|---|---|
| 5,890,720 A * | 4/1999 | Antoni | B23B 31/16233 279/123 |
| 5,899,464 A * | 5/1999 | DeFeo | B23B 31/16241 279/124 |
| 7,311,312 B2 * | 12/2007 | Nishimiya | B23B 31/16266 279/121 |
| 10,926,338 B2 * | 2/2021 | Nishimiya | B23B 31/16233 |

FOREIGN PATENT DOCUMENTS

| | | | | |
|---|---|---|---|---|
| GB | 2176135 A | | 12/1986 | |
| JP | 57-114304 A | | 7/1982 | |
| JP | 60217007 A | * | 10/1985 | ....... B23B 31/16233 |
| JP | 61008209 A | * | 1/1986 | ....... B23B 31/16233 |
| JP | 61-050703 A | | 3/1986 | |
| JP | 61244401 A | * | 10/1986 | ....... B23B 31/16245 |
| JP | 02071910 A | * | 3/1990 | ....... B23B 31/16237 |
| JP | H2-071911 A | | 3/1990 | |
| JP | H4-023211 U | | 2/1992 | |
| JP | H5-212608 A | | 8/1993 | |
| JP | 2560114 B2 | | 12/1996 | |
| JP | 10-296511 A | | 11/1998 | |
| JP | 2014-155992 A | | 8/2014 | |
| JP | 2015058529 A | * | 3/2015 | |
| WO | WO-2009025457 A2 | * | 2/2009 | ....... B23B 31/16258 |

* cited by examiner

<Prior Art>

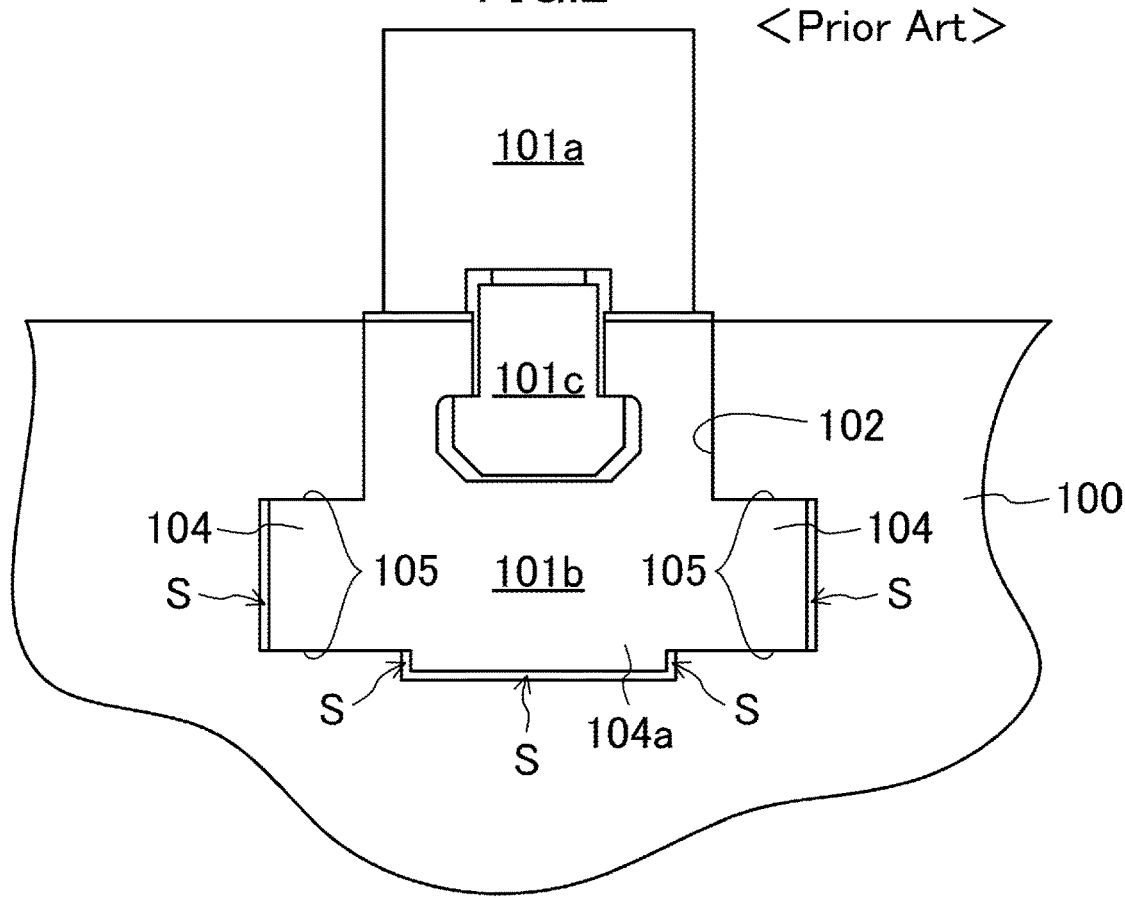
FIG.2 <Prior Art>
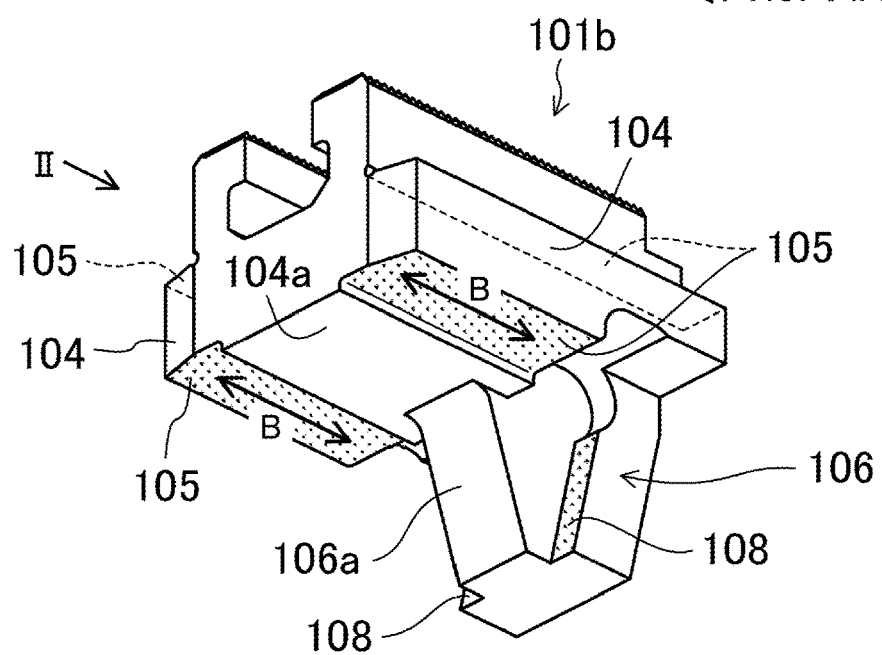
FIG.3 <Prior Art>

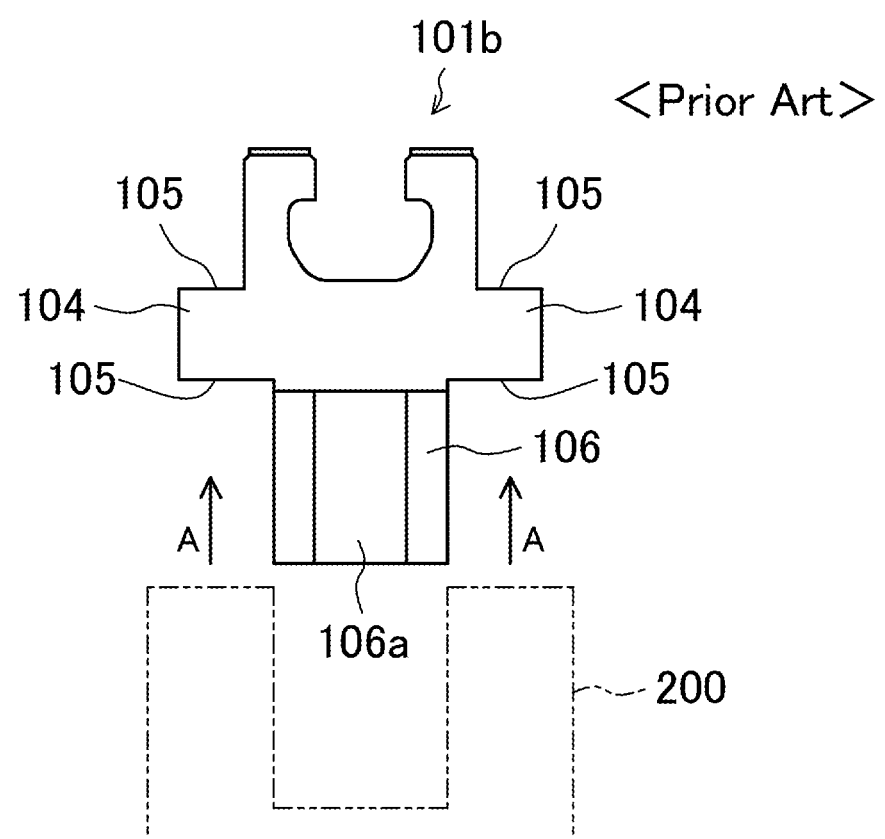
FIG.4 <Prior Art>

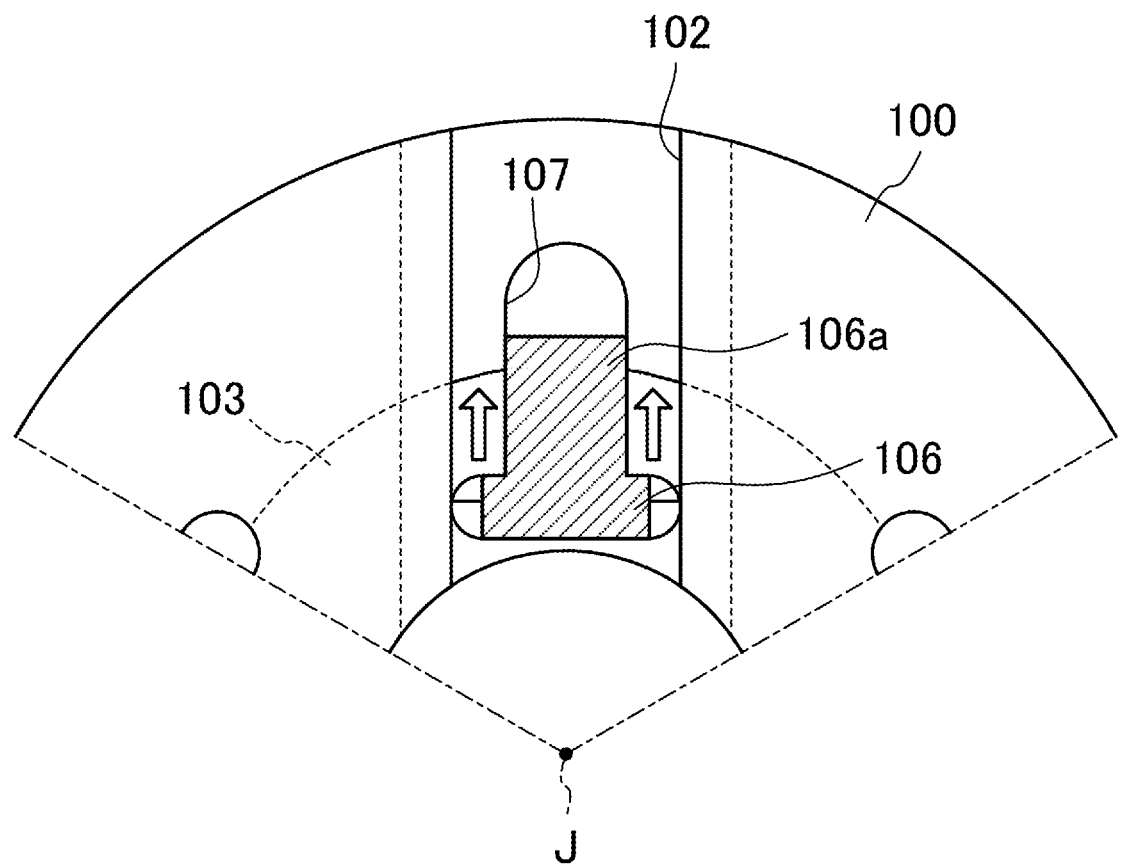
FIG.5  <Prior Art>

US 11,141,798 B2

CHUCK AND METHOD FOR MANUFACTURING SAME

TECHNICAL FIELD

The present disclosure relates to a chuck that supports a workpiece and is used for a lathe, for example.

BACKGROUND ART

FIG. 1 shows a cross-sectional structure of a known chuck of the type described above (an appearance structure is shown in FIG. 6). In order to support a workpiece with a rotation axis J coinciding with the chuck, a body 100 includes, on its front surface, a plurality of top jaws 101a arranged like rays to slide in a radial direction. The top jaws 101a are, together with T-nuts 101c, detachably attached to master jaws 101b in the body 100 to slide in the radial direction.

As shown in FIG. 2, each master jaw 101b is assembled to the body 100, while being fitted in a keyway 102 extending in the radial direction and having a T-shaped cross section. In addition, each master jaw 101b is connected to a plunger 103 in the body 100 so as to slide in the radial direction in conjunction with an axial slide of the plunger 103.

Specifically, once the plunger 103 slides rearward, the master jaws 101b slide radially inward. Accordingly, a workpiece is supported radially inside the top jaws 101a. Once the plunger 103 slides forward, the master jaws 101b slide radially outward. Accordingly, the support of the workpiece is released.

As shown in FIG. 3, a pair of key protrusions 104 and 104 protrude from respective sides of each master jaw 101b. These key protrusions 104 and 104 have sliding surfaces 105 (dotted in the figure) facing forward and rearward. As shown in FIG. 2, these sliding surfaces 105 are in surface contact with the keyway 102 in the axial direction. In each master jaw 101b, there are gaps S between the keyway 102 and the side of each key protrusion 104, between the keyway 102 and a step 104a slightly protruding between the pair of sliding surfaces 105 and 105 facing rearward, and between the keyway 102 and each side of the step 104a (i.e., without any surface contact).

A wedge-like protrusion (i.e., a wedge 106) protrudes behind the radially inner end of each master jaw 101b. This wedge 106 is configured to be fitted into a wedge-like groove in the plunger 103. The wedge 106 includes a rib 106a significantly extruding in the radial direction to ensure strength.

Since the sliding surfaces 105 are required to have high dimensional accuracy and smoothness and are thus subjected to grinding processing. Specifically, as indicated by the arrows A in FIG. 4, a grinder of a grinding machine 200 that is positioned highly accurately is pressed onto the pair of sliding surfaces 105 and 105 facing rearward and is then controlled to slide in the sliding directions as indicated by the arrows B in FIG. 3. In this manner, the sliding surfaces 105 are ground so as to have predetermined dimensional accuracy and smoothness.

The pair of sliding surfaces 105 and 105 facing forward are ground similarly. Patent Document 1 discloses a chuck including similar master jaws.

CITATION LIST

Patent Documents

Patent Document 1: Japanese Patent No. 2560114

SUMMARY OF THE INVENTION

Technical Problem

As shown in FIG. 1, if a workpiece is supported radially inside the top jaws 101a, a force acts, as a reaction force, on each top jaw 101a in the direction indicated by the arrow M. Due to the rearward draw of the plunger 103 and a wedge effect, the wedge 106 receives a radially inward force as indicated by the arrow N. These forces cause strong moments acting on the master jaw 101b as indicated by the arrows C in FIG. 1.

The master jaws 101b are arranged like rays. Thus, when the master jaws 101b support a workpiece, the moments of such forces act in the points corresponding to the locations of the master jaws.

By contrast, the known master jaws 101b such as those described above are supported by the body 100 via the fitting parts having a relatively small contact area between the keyways 102 and the sliding surfaces 105 of the pair of key protrusions 104 and 104 protruding to respective sides of the master jaws. Such configuration tends to cause distortions or deformations in the key protrusions 104, which may result in floating of the top jaws 101a and give a negative influence on the support accuracy.

In the case of the known master jaw 101b, the sliding surfaces 105 are ground in the sliding direction. The wedge 106 between the sliding surfaces 105 and 105 has a circumferential width that is narrower than the distance between the sliding surfaces 105 and 105 on both sides.

If the wedge 106 has a smaller width, the force acting on the body 100 from the plunger 103 as indicated by the white arrows in FIG. 5 is concentrated in one circumferential direction, thereby causing distortions or deformations in the body 100.

To address the problem, it is an objective of the present disclosure to provide a chuck capable of stably supporting a workpiece and less likely to cause distortions or deformations in master jaws or a body.

Solution to the Problem

The present disclosure relates to a chuck including a body and a plurality of jaws, plurality of jaws being positioned at a front surface of the body while supporting a workpiece with rotation axes of the chuck and the workpiece coinciding with each other.

The chuck includes: a plunger arranged inside the body with a center of the plunger coinciding with the rotation axes and configured to slide in an axial direction; and a plurality of master jaws each constituting one of the jaws and configured to slide in a radial direction in the front surface of the body in conjunction with the slide of the plunger.

The body includes: a plurality of keyways arranged like rays at equal intervals in the front surface and having a transverse section having a substantially inverted T-shape toward front; and a housing chamber at a center of the body to communicate with the plurality of keyways, the plunger being fitted in the housing chamber. Each of the master jaws includes: a narrower part fitted in a front portion of an associated one of the keyways and exposed to the front surface of the body; a wider part fitted in a rear portion of the associated one of the keyways and sliding along the associated one of the keyways; and a wedge protruding rearward from a radially inner end of the wider part and connected to the plunger.

The wider part has a flat wider sliding surface in an entire region radially outside the wedge, and each of the keyways has a wider slid surface that comes into surface contact with the wider sliding surface.

Unlike the chuck of the known art having the sliding surfaces only on both sides of the radially outer region of each wedge, this chuck has the flat wider sliding surface in the entire region radially outside each wedge. In addition, each of the keyways has the wider slid surface that is in surface contact with the wider sliding surface.

As a result, this chuck can receive strong forces that act on the master jaws by the surface contact between the wider sliding surface and the wider slid surface, each having a larger area. As a result, distortions and deformations are less likely to occur in the master jaws, and the accuracy in supporting a workpiece improves.

In one preferred embodiment, the wider sliding surface is slidable in both of the radial direction and a circumferential direction while being in surface contact.

In one preferred embodiment, the wedge has a greater width than the narrower part.

In one preferred embodiment, the plunger has, on an outer circumference of the plunger, a plurality of wedge housing grooves each having a transverse section having a substantially inverted T-shape toward radially outside and inclined so as to be closer to a center toward the front. The wedge includes: a sliding part fitted in a radially inner part of an associated one of the wedge housing grooves to slide along the associated one of the wedge housing grooves; and a loosely fitting sliding part fitted in a radially outer part of the associated one of the wedge housing grooves. The loosely fitting sliding part is housed inside the associated one of the wedge housing grooves so as not to come out of the plunger.

In one preferred embodiment, transverse ends of the sliding parts of the master jaws are arranged at substantially equal intervals in the circumferential direction.

In one preferred embodiment, transverse ends of the sliding parts of the master jaws are arranged in the circumferential direction at intervals at a central angle of about 60 degrees.

In one preferred embodiment, a method of manufacturing the chuck described above includes forming the wider sliding surface by finishing processing in a direction orthogonal to a sliding direction of the wider sliding surface.

Advantages of the Invention

The disclosed technique is less likely to cause distortions or deformations in a body or master jaws and thus allows highly accurate and stable support of a workpiece.

BRIEF DESCRIPTION OF THE DRAWINGS

FIG. 2 is a schematic view (of the known art) as viewed along the arrow I in FIG. 1.

FIG. 3 is a schematic perspective view showing a master jaw (according to known art).

FIG. 4 is a schematic view (of the known art) as viewed along the arrow II in FIG. 3.

FIG. 5 is a schematic view of the part of a keyway of a body (according to known art) as seen from the front.

DESCRIPTION OF EMBODIMENT

An embodiment of the present invention will be described in detail with reference to the drawings. Note that the following description of the embodiment is merely an example in nature, and is not intended to limit the scope, applications, or use of the present invention.

<Structure of Chuck>

Figure 6:
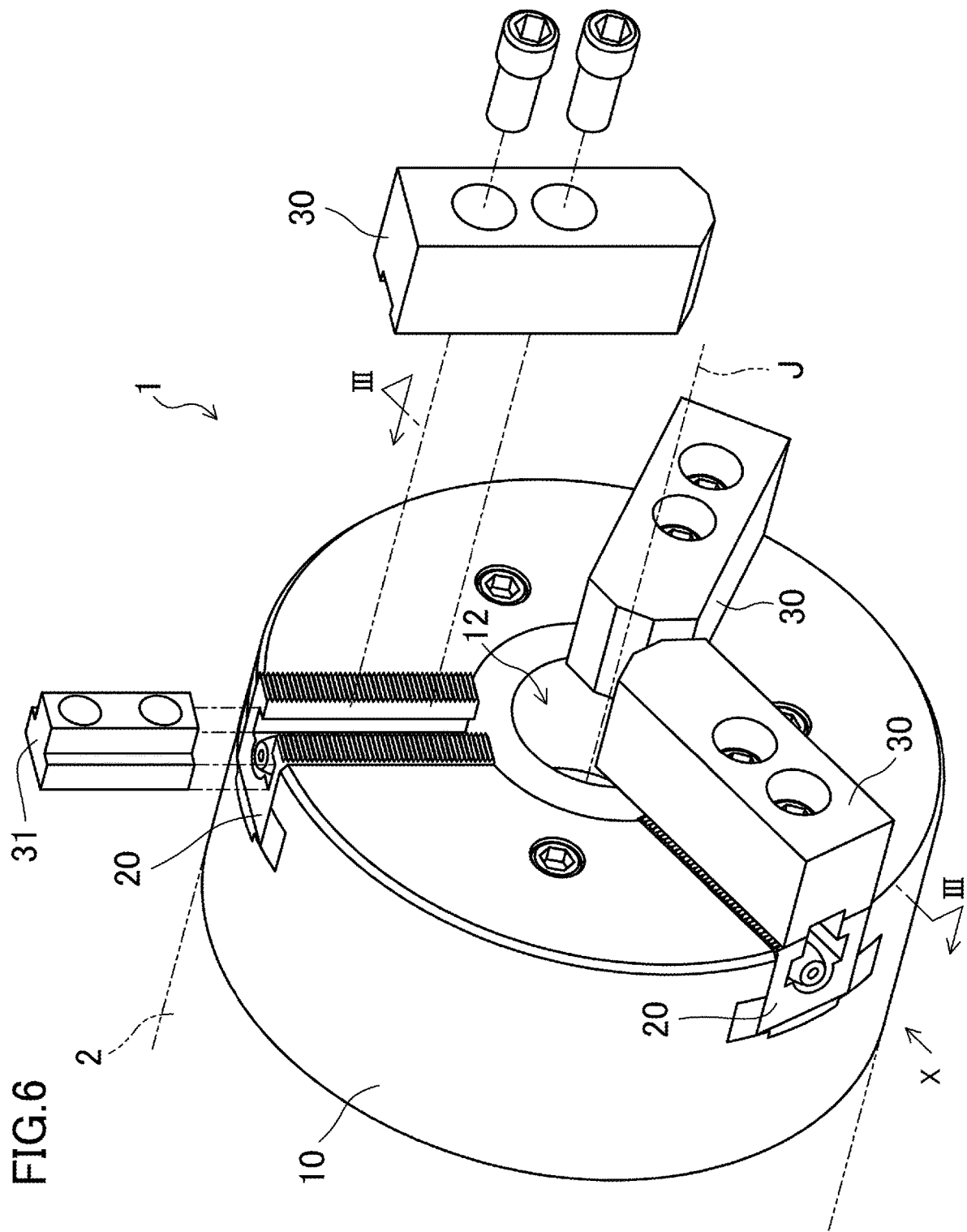
FIG. 6 is a schematic perspective view showing a chuck according to an embodiment.
Figure 7:
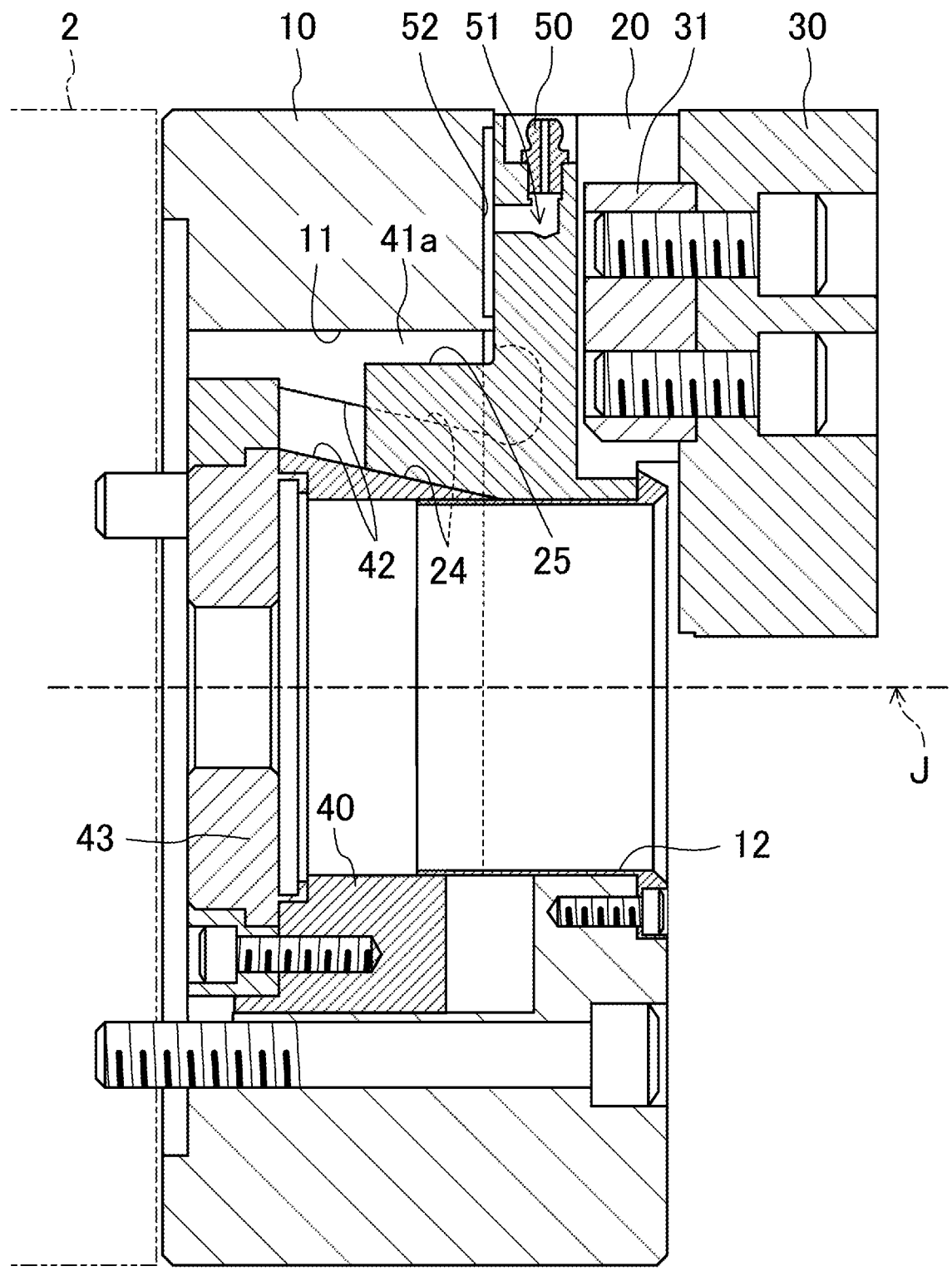
FIG. 7 is a schematic transverse sectional view taken along the arrow in FIG. 6. A master jaw is in a closed position.

FIGS. 6 and 7 show a chuck 1 according to an embodiment. The chuck 1 has a thick, disk-like appearance and is attached to a machine tool 2 such as a lathe so as to rotate about a rotation axis J in a predetermined direction. During processing, the chuck 1 firmly supports a workpiece with the axes of the chuck and the workpiece coinciding with the rotation axis J.

In the description, the "rear" of the chuck 1 is attached to the machine tool 2, and the "front" of the chuck 1 supports the workpiece. In addition, the "axial" direction corresponds to the direction in which the rotation axis J extends. The "circumferential" direction corresponds to the direction around the rotation axis J. The "radial" direction corresponds to the direction along the radius or diameter of the chuck with respect to the rotation axis J. In the radial direction, the center of the chuck 1, that is, the rotation axis J is located "radially inside." The outer circumference of the chuck 1 is located "radially outside."

Figure 8:
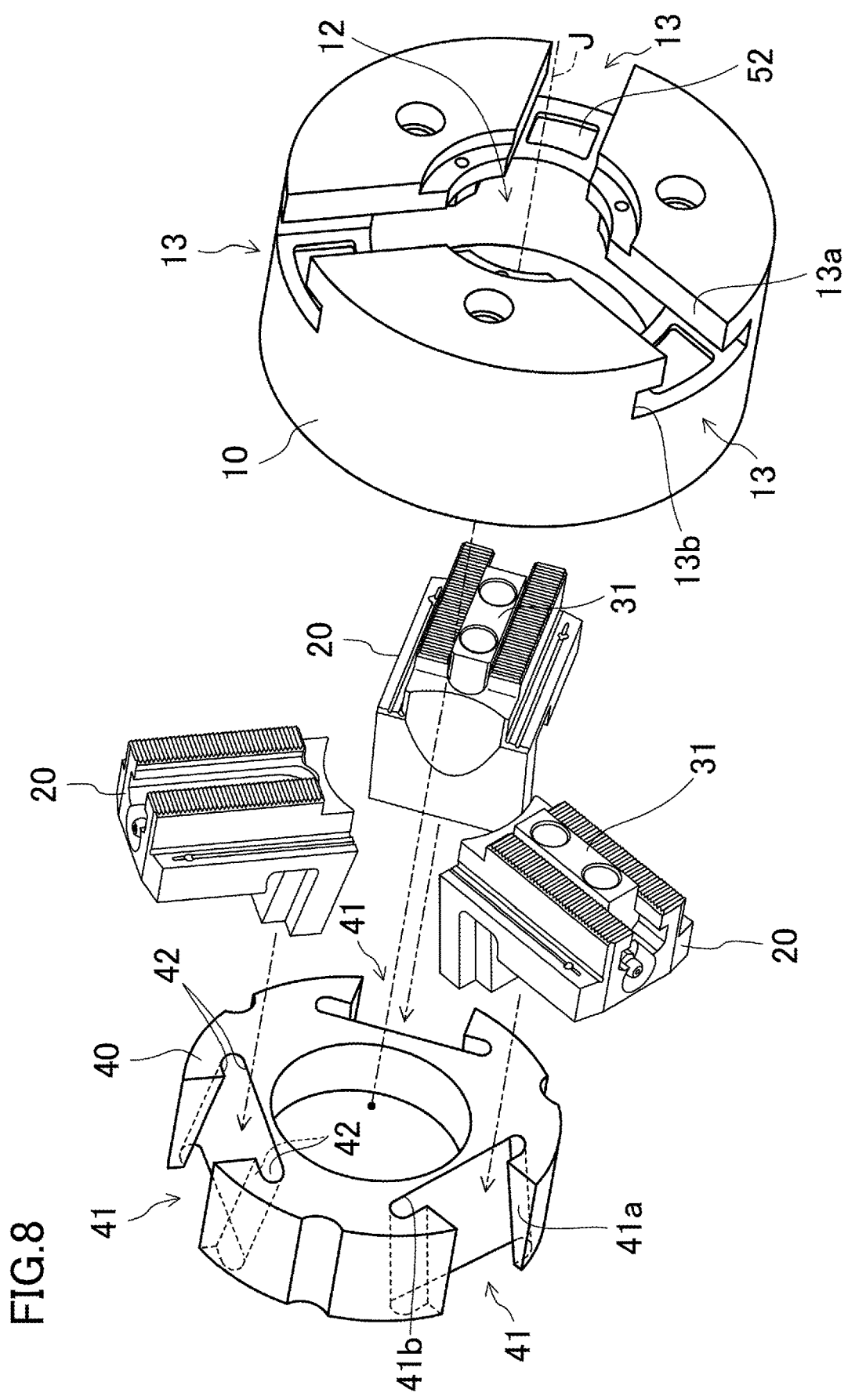
FIG. 8 is an exploded perspective view of a main member of the chuck.

As shown in FIG. 8, the chuck 1 includes a body 10, master jaws 20, and a plunger 40, for example. The body 10 includes, on its front surface, a plurality of (e.g., two or more in one preferred embodiment, three in this embodiment) top jaws 30 arranged circumferentially at equal intervals.

The body 10 and the master jaws 20 include a mechanism (i.e., a lubricant supply mechanism) for supplying a grease (i.e., an example lubricant) into the chuck 1, which will be described later.

The master jaws 20 slide radially in the front surface of the body 10. Each of top jaws 30 is, together with a T-nut 31, removably attached to one of the master jaws 20 with bolts, thereby constituting a jaw. Each top jaw 30 may be integral with one of the master jaws 20.

Each top jaw 30 may be in various shapes depending on the application and is in the shape of a cuboid in this embodiment. The radially inner end surface serves as a support for the workpiece. Alternatively, the top jaw 30 may have the support located radially outside so that a workpiece, such as a cylindrical body, is supported from the inside.

The body 10 is made of a metal member with a thick, disk-like appearance. The rear of the body 10 is fixed to a spindle of a machine tool (not shown) with mounting bolts. At a central part of the body 10 facing the rear, a cylindrical housing chamber 11 is open. The body 10 has, at the center of the front surface, a circular opening 12 that communicates with the housing chamber 11. The front surface of the body 10 is a flat surface orthogonal to the rotation axis J.

The body 10 has, in the front surface, three keyways 13 arranged circumferentially at equal intervals. The keyways 13 extend like rays and radially outward from the periphery of the housing chamber 11 and pass through the body 10 between the outer peripheral surface of the body 10 and the housing chamber 11. Each keyway 13 has a transverse section having a substantially inverted T-shape toward the front.

Specifically, each keyway 13 includes a front (i.e., a front slide 13a) and a rear (i.e., a rear slide 13b). The front is open to the front surface of the body 10 and has a relatively smaller width (which corresponds to the circumferential size, and the same applies hereinafter). The rear is located behind the front and continuous with the front, and has a relatively greater width.

The plunger 40 is fitted in the housing chamber 11 so as to slide in the axial direction, with the center of the plunger 40 coinciding with the rotation axis J. As shown in FIG. 8, the plunger 40 is a substantially cylindrical metal mass and has an outer peripheral surface that comes into surface contact with the inner peripheral surface of the housing chamber 11 and slides on the surface. The plunger 40 has, in the outer circumference, three wedge housing grooves 41 arranged in accordance with the locations of the keyways 13.

Each wedge housing groove 41 has a transverse section having a substantially inverted T-shape toward the radially outside. Specifically, each wedge housing groove 41 includes a radially outer part (i.e., a loosely fitted slid part 41a) and a radially inner part (i.e., a slid part 41b). The radially outer part is open to the outer circumferential surface of the plunger 40 and has a relatively smaller width. The radially inner part is located inside the outer part and continuous with the outer part, and has a relatively greater width.

Each slid part 41b has, at both transverse ends, a pair of slid surfaces 42 and 42 facing each other in the radial direction. These slid surfaces 42 are ground to have high dimensional accuracy and smoothness.

Each wedge housing groove 41 is inclined so as to be closer to the center toward the front. Specifically, each wedge housing groove 41 is inclined at a predetermined angle so that the wedge housing groove 41 comes closer to the center in the radial direction with a decreasing distance to the front (i.e., with an increasing distance from the rear).

A cylindrical connector 43 is fixed to the rear of the plunger 40. The plunger 40 is connected to a cylinder (not shown) via the connector 43. Accordingly, the plunger 40 is controlled by the machine tool 2 so as to slide in the axial direction.

(Master Jaw 20)

Figure 9:
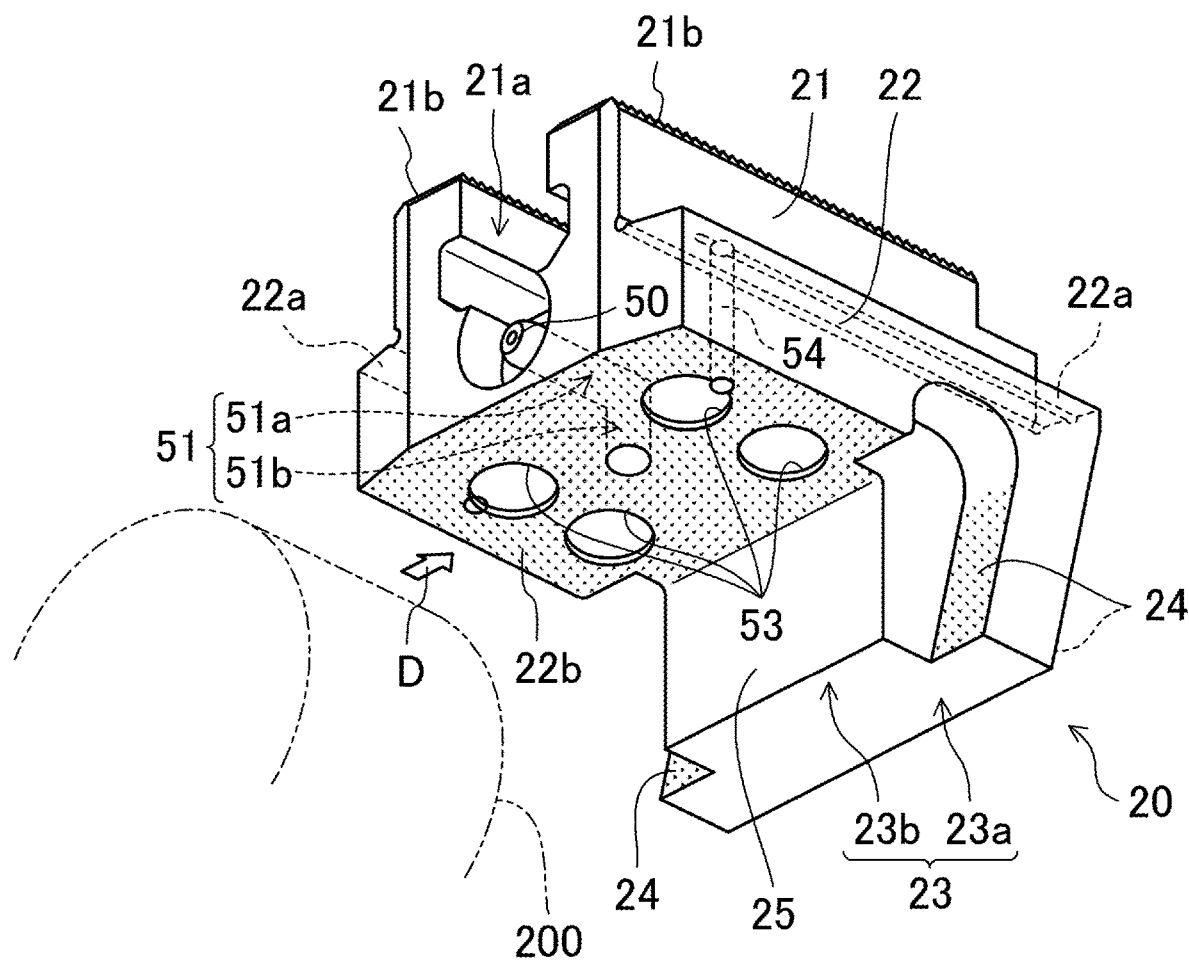
FIG. 9 is a schematic perspective view showing the rear of the master jaw.
Figure 10:
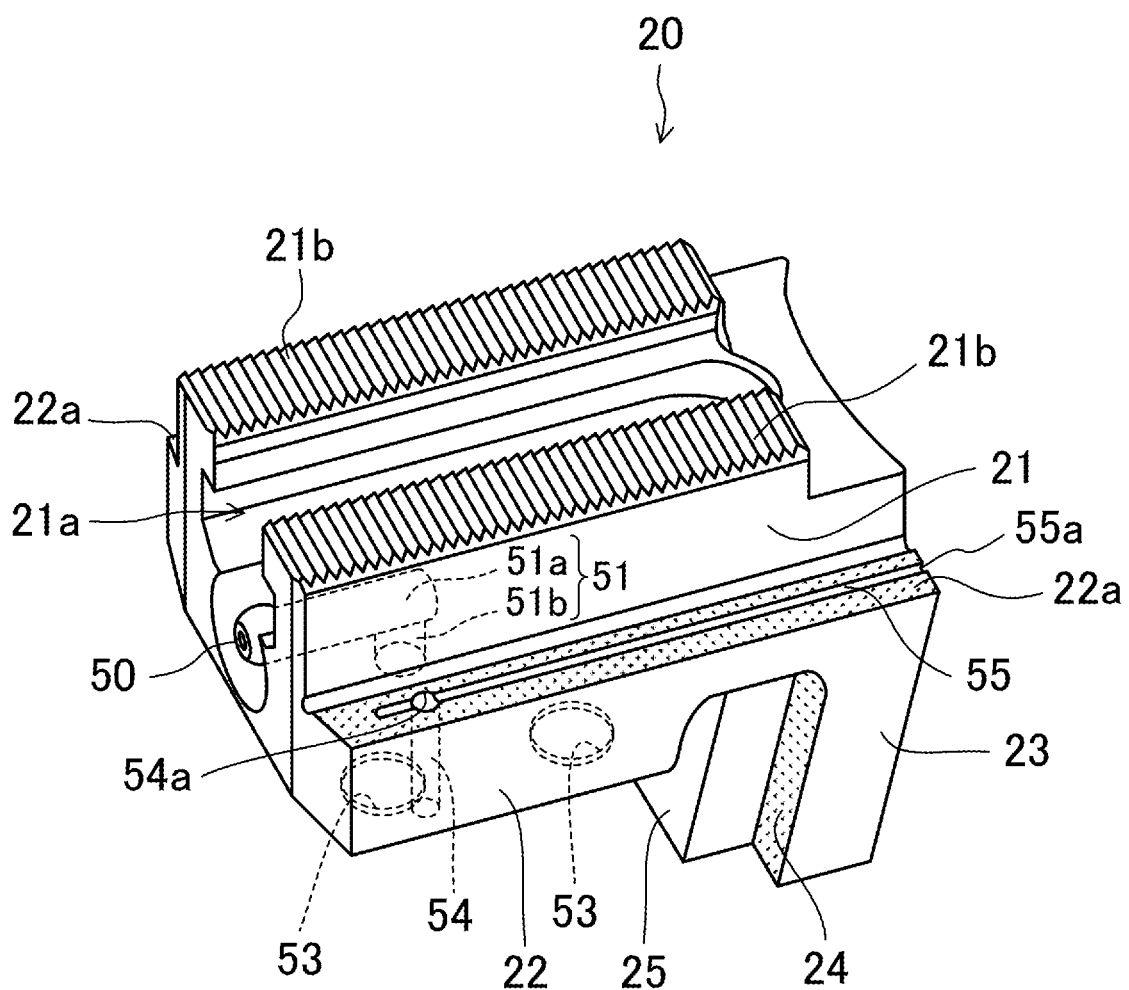
FIG. 10 is a schematic perspective view showing the front of the master jaw.

As shown in FIG. 8, each master jaw 20 is incorporated in the body 10 while being fitted in the associated keyway 13 and wedge housing groove 41. FIGS. 9 and 10 show a detailed structure of each master jaw 20. The master jaws 20 are hard metal members.

The master jaw 20 includes a narrower part 21, a wider part 22, and a wedge 23, for example. The narrower part 21 is fitted in the front slide 13a (i.e., the front) of the associated keyway 13 to constitute the part exposed to the front of the body 10. The wider part 22 is located behind and continuous with the narrower part 21 to constitute the part to be fitted into the rear slide 13b (i.e., the rear) of the keyway 13. The wedge 23 protrudes rearward from the radially inner end of the wider part 22, is located in the housing chamber 11, and constitutes the part to be connected to the plunger 40.

The narrower part 21 is in the shape of a prism extending in the radial direction and has, in the part exposed from the body 10, a transverse section having a substantially inverted T-shape toward the front. The narrower part 21 includes a nut groove 21a extending in the radial direction and a pair of serrated joints 21b and 21b expanding to both sides.

Each T-nut 31 is slidably fitted in the associated nut groove 21a. Each top jaw 30 is fastened to the associated T-nut 31, with a serrated jointed part (not shown) of the top jaw 30 jointed to the associated joint 21b. Accordingly, the top jaw 30 is integral with the master jaw 20 while being positioned with respect to the master jaw 20.

The wider part 22 has a greater width than the narrower part 21 and has parts (corresponding to key protrusions) protruding beyond both sides of the narrower part 21. The wider part 22 has, at the front on each lateral side of the narrower part 21, a flat sliding surface (i.e., a narrower sliding surface 22a) extending along the narrower part 21. The narrower sliding surfaces 22a and 22a are ground to have high dimensional accuracy and smoothness.

In this master jaw 20, the wider part 22 has, in the entire region radially outside the wedge 23, a flat sliding surface (i.e., a wider sliding surface 22b). The wider sliding surface 22b is also finished, specifically ground, to have high dimensional accuracy and smoothness. The wider sliding surface 22b is ground by sliding transversely (i.e., orthogonal to the sliding direction) unlike the known art.

Specifically, as shown in FIG. 9, a grinder of a grinding machine 200 is pressed onto the wider sliding surface 22b, and is controlled to slide transversely as indicated by the white arrow D. The wider sliding surface 22b is ground in this manner so as to have predetermined dimensional accuracy and smoothness. As a result, the wider sliding surface 22b becomes a smooth surface without any step and is slidable in both of the radial direction and the circumferential direction while being in surface contact.

The wedge 23 has a greater width than the narrower part 21. In the case of this master jaw 20, the wedge 23 has the same width as the wider part 22, and the side end surface of the wedge 23 and the side end surface of the wider part 22 are continuous and flush with each other.

The wedge 23 includes a sliding part 23a and a loosely fitting sliding part 23b. The sliding part 23a is fitted into the slid part 41b (i.e. the radially inner part). The loosely fitting sliding part 23b is fitted into the loosely fitted slid part 41a (i.e., the radially outer part). The loosely fitting sliding part 23b has a smaller width than the loosely fitted slid part 41a. The sliding part 23a has a smaller width than the slid part 41b.

The sliding part 23a has, at both transverse ends, ground sliding surfaces 24 facing radially inward and outward. Accordingly, the sliding surfaces 24 and 24 come into surface contact with the slid surfaces 42 and slide along the associated wedge housing groove 41.

Having the greater width, the wedge 23 has a sufficient strength even with a smaller thickness in the radial direction. Accordingly, the loosely fitting sliding part 23b has a wider end surface 25 extending from the edge of the wider sliding surface 22b and substantially orthogonal to the wider sliding surface 22b. This wider end surface 25 is located inside the loosely fitted slid part 41a. As a result, as shown in FIG. 7, while being fitted in the wedge housing groove 41, the wedge 23 is housed inside the wedge housing groove 41 so as not to come out of the plunger 40.

(Keyway 13)

Figure 11:
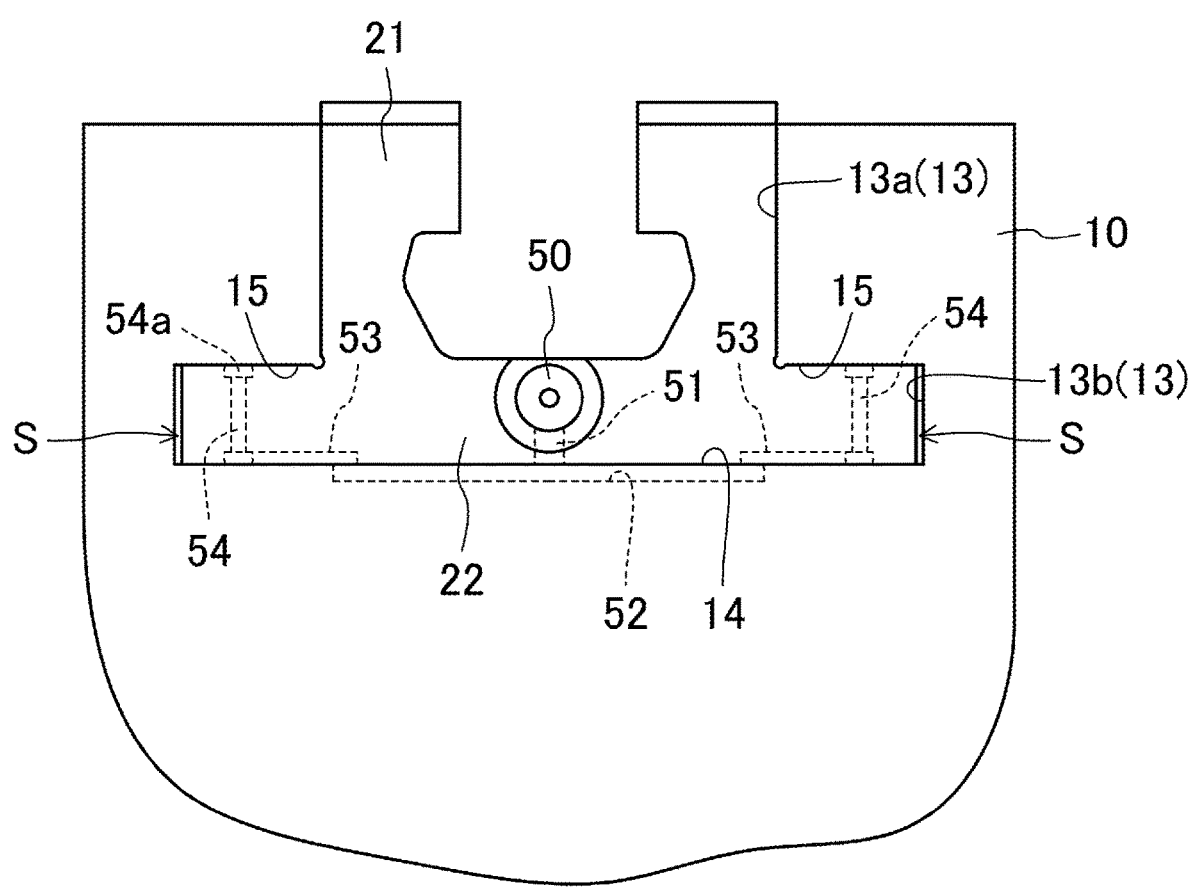
FIG. 11 is a schematic view of the part of a keyway of a body as seen from the outside in the radial direction.

As shown in FIG. 11, each front slide 13a has the substantially same width as the associated narrower part 21. On the other hand, each rear slide 13b has a slightly greater width than the associated wider part 22. Both the side surfaces of the narrower part 21 come into surface contact with the inner surface (i.e., surfaces facing each other in the circumferential direction) of the front slide 13a and slide. On the other hand, there is a gap S between each side surface of the wider part 22 and the surfaces of the rear slide 13b facing each other in the circumferential direction.

The thickness of the wider part 22 is substantially the same as the size of the rear slide 13b in the axial direction. The surface (i.e., a wider slid surface 14) corresponding to the bottom of each keyway 13 and facing the front of each rear slide 13b, and the surface (i.e., a narrower slid surface 15) protruding to each side of the front slide 13a and facing the rear of the rear slide 13b are both ground to be smooth surfaces. With this configuration, each master jaw 20 is fitted into the associated keyway 13, which brings the narrower slid surfaces 15 into surface contact with the corresponding narrower sliding surfaces 22a, and the wider slid surface 14 into surface contact with the wider sliding surface 22b.

In conjunction with the slide of the plunger 40 in the axial direction, the master jaws 20 slide and shift in the radial direction. That is, once the plunger 40 slides forward, each master jaw 20 slides radially outward as indicated by the white arrow E in FIG. 12 from the radially inner position as shown in FIG. 7. On the other hand, once the plunger 40 slides rearward, each master jaw 20 slides radially inward.

Figure 12:
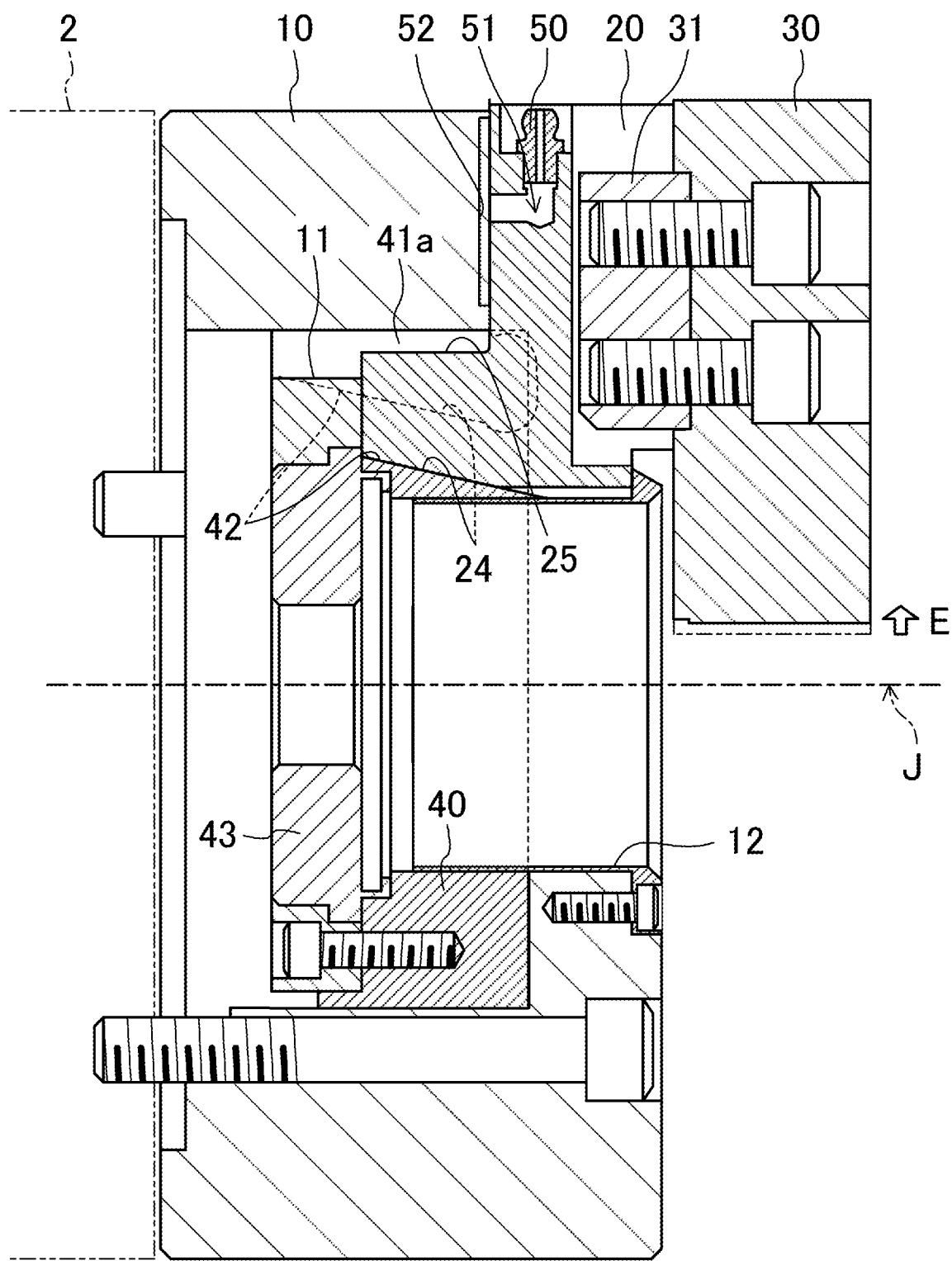
FIG. 12 is a schematic transverse sectional view taken along the arrow in FIG. 6. The master jaw is in an open position.

For example, in order to support the workpiece radially inside, the plunger 40 slides rearward from the state shown in FIG. 12 and the master jaws 20 slide radially inward. In this manner, a workpiece is supported by the radially inner end surfaces of the top jaws 30.

Figure 1:
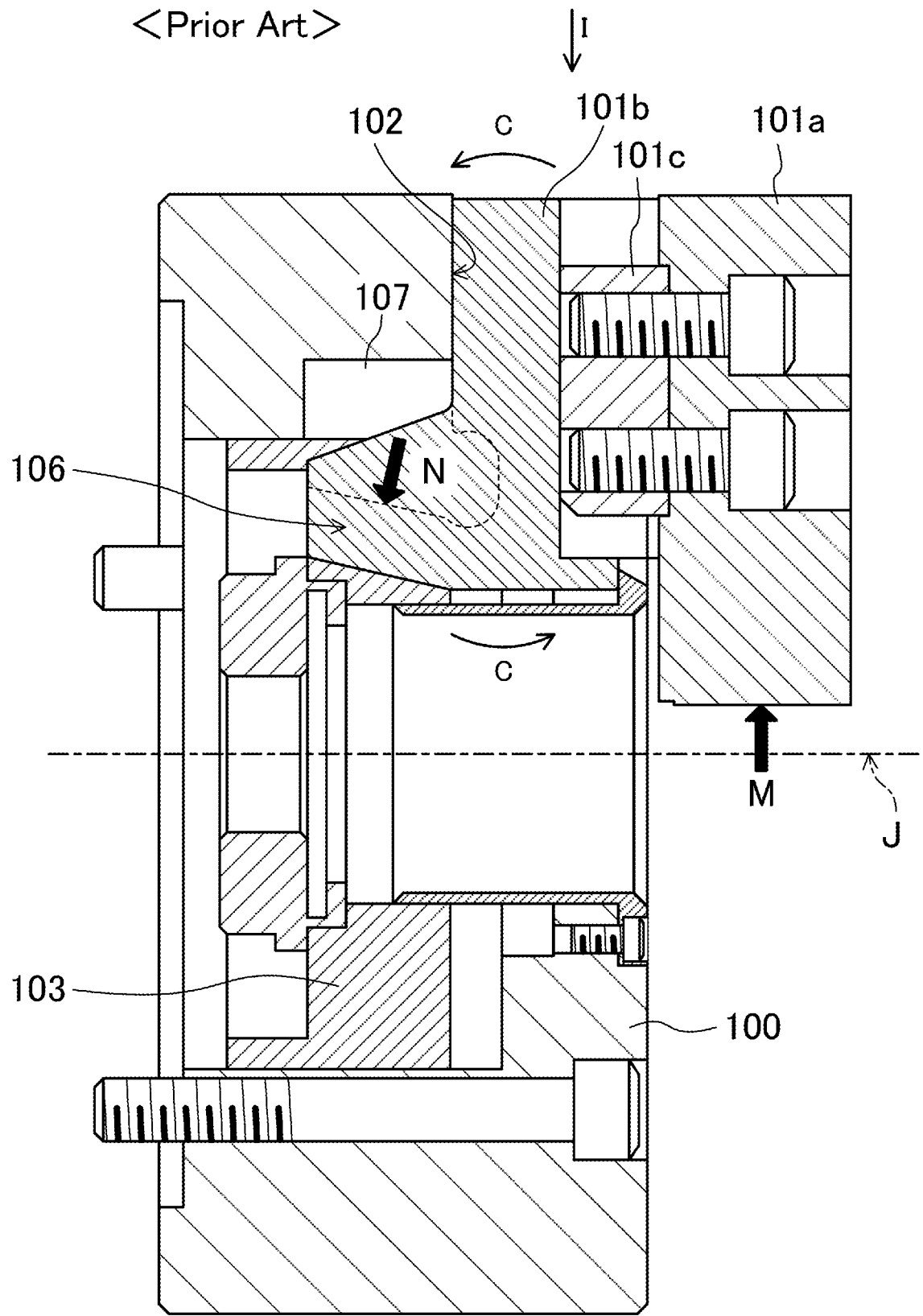
FIG. 1 is a schematic view showing a cross-sectional structure of a chuck (according to known art).

At this time, the radially inner end surfaces of the top jaws 30 receive a strong radially outward force, as in the known art shown in FIG. 1. In addition, the rears of the master jaws 20 receive a strong radially inward force from the plunger 40 via the contact regions between the slid surfaces 42 of the slid part 41b of each wedge housing groove 41 and the sliding surfaces 24 of the sliding part 23a of the wedge 23. Accordingly, a strong moment (i.e., a torsional force) acts on the master jaws 20 which makes the master jaws 20 turn such that the radially outer sides head rearward and the radially inner sides head forward.

In the known art, as shown in FIGS. 3 and 4, the sliding surfaces are formed by grinding in the sliding direction. There are non-ground parts, having steps, at radially outside portions of each wedge 106. The sliding surfaces are formed only on both sides of the non-ground parts. The torsional force is received via the sliding surfaces and the sliding surfaces facing forward.

The strong torsional effect is received via these regions having a small contact area. Thus, distortions or deformations tend to occur in the master jaws 101b, which may result in floating of the top jaws 30 and give a negative influence on the support accuracy.

By contrast, in the chuck 1, the sliding surfaces facing the rears of the master jaws 20 are formed by grinding in the direction orthogonal to the sliding direction. As a result, the wider sliding surfaces 22b expanding in the width direction are formed in the respective wider parts 22 of the master jaws 20. As shown in FIG. 11, the entire regions of the wider sliding surfaces 22b come into surface contact with the wider slid surfaces 14 of the respective keyways 13 formed in the body 10.

The surface contact used herein is complete surface contact with the entire regions of the wider sliding surfaces 22b in one preferred embodiment, but may include non-contact parts such as grooves (or holes) for a grease supply passage, or clearance grooves (or holes) for facilitating the grinding processing. When supporting a workpiece, the master jaws 20 are inclined with respect to the associated keyways 13 due to the effects of the moments. Radially outer portions of the wider sliding surfaces 22b come into strong surface contact with the wider slid surfaces 14. The regions corresponding to radially inner portions of the wider slid surfaces 14 could thus be not in contact with the wider slid surfaces 14. Even in this case, larger areas of the master jaws 20 come into contact with the keyways 13 than in the known art.

Accordingly, the chuck 1 receives one of strong torsional forces acting on the master jaws 20 by the surface contact between the wider sliding surfaces 22b having a large area and the wider slid surfaces 14. As a result, distortions and deformations are less likely to occur in the master jaws 20, and the floating of the top jaws 30 decreases, which improves the accuracy in supporting a workpiece. The workpiece can thus be stably supported.

In addition, the wider sliding surfaces 22b, which is formed through grinding in the direction perpendicular to the sliding direction, eliminates the limits on the width of the wedges 23 to be smaller than the distance between the sliding surfaces on both sides. The wedges 23 have a greater width than the narrower parts 21. Accordingly, the strength of the wedges 23 increases. There is thus no need to provide the ribs 106a significantly extruding in the radial direction to ensure the strength of the wedges 23. The wedges 23 are housed in the plunger 40.

As a result, there is no need to form any recess (see reference numeral 107 in FIGS. 1 and 5) in the body 10 not to come into contact with the ribs 106a, whereby the rigidity of the body 10 improves.

In the known art, each wedge 106 has a narrow width as shown in FIG. 5, thereby easily causing distortions or deformations in the wedge 106. By contrast, the chuck 1 includes the wider wedges 23, which is less likely to cause distortions or deformations in the wedges 23.

As in the known art, the narrower wedges concentrate the force acting on the body 100 from the plunger 103 in three portions of the body 100 in the circumferential direction as indicated by the white arrows in FIG. 5. Accordingly, larger distortions tend to occur in the body 100.

Figure 13A:
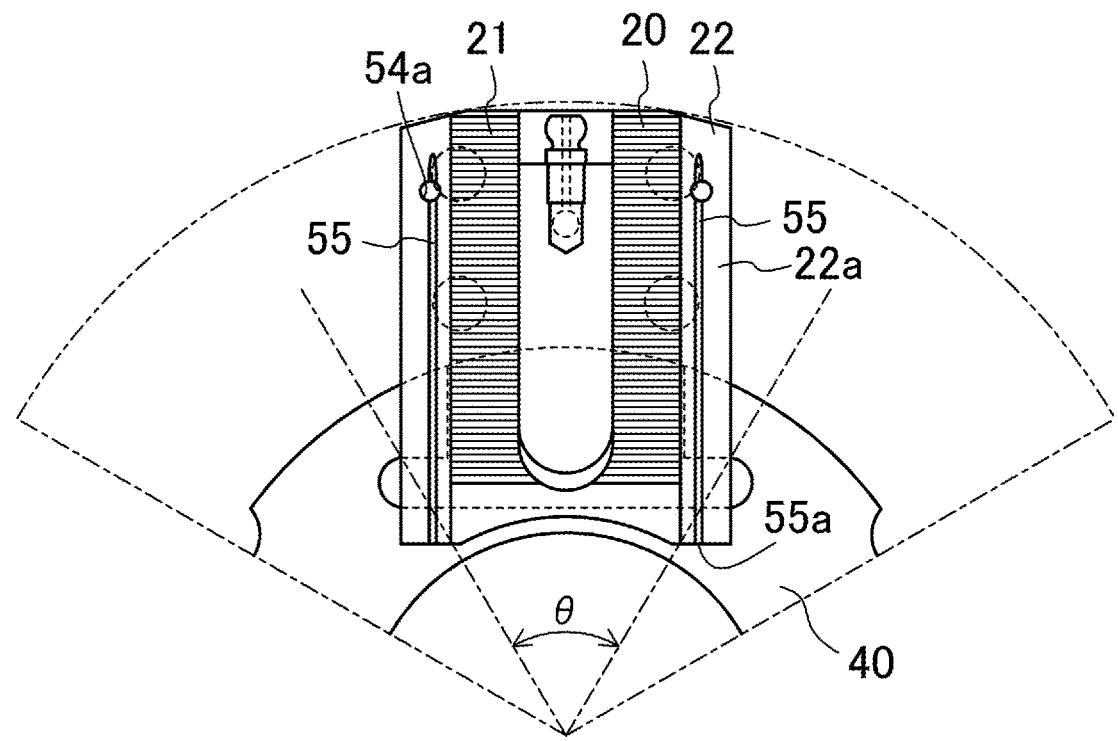
FIG. 13A is a schematic view of the master jaw and a plunger as viewed from the front.

By contrast, in the chuck 1, the transverse ends of the sliding part 23a of each master jaw 20 are dispersed in the circumferential direction. Specifically, as shown in FIGS. 13A and 13B, six portions of the respective transverse ends of the sliding part 23a of each master jaw 20 (specifically, the radially inner or outer corners at the respective ends) are arranged in the circumferential direction at substantially equal intervals, that is, intervals at a central angle θ of about 60 degrees.

Figure 13B:
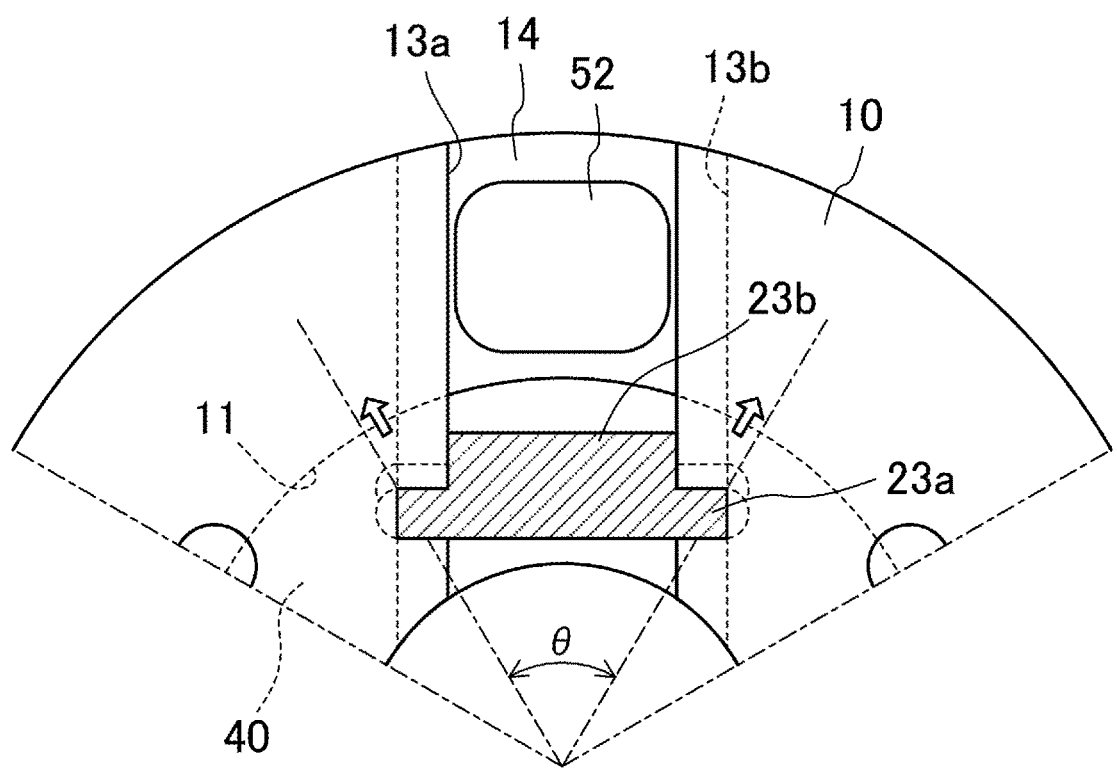
FIG. 13B is a schematic view of the part of the keyway of the body as seen from the front.

As indicated by the white arrows in FIG. 13B, the forces act on the body 10 from the plunger 40. Since the outer circumferential surface of the plunger 40 is in surface contact with the inner peripheral surface of the housing chamber 11, the forces act so as to push the body 10 outward as indicated by the white arrows.

The acting forces are distributed to six parts located at substantially equal intervals in the circumferential direction, which reduces distortions or deformations of the body 10.

For example, it is confirmed from the calculation performed using simple models that if the magnitude of the force that acts is the same, the distortions of the body can be reduced to one tenth in a case in which the forces are distributed to six parts of the body located at equal intervals in the circumferential direction, compared with a case in which the forces are concentrated in three parts of the body located at equal intervals in the circumferential direction.

As described above, the chuck 1 disclosed in the embodiment is less likely to cause distortions or deformations in the body 10 or the master jaws 20, thereby highly accurately and stably supporting a workpiece.

(Lubricant Supply Mechanism)

In the sliding portions, a sufficient lubricant needs to spread to smoothly operate the master jaws 20 or to reduce wears, for example. On the other hand, a grease is difficult to spread on the sliding portions if the slides have a larger area. This may cause disadvantages such as malfunctions or a decrease in durability.

To address the problem, the chuck 1 has a simple, devised structure for spreading the grease over the entire regions of the sliding portions including the sliding portions between the wider sliding surfaces 22b and the corresponding wider slid surfaces 14.

As shown in FIGS. 7 and 9, for example, the chuck 1 has grease nipples 50 (example oil inlets) each on an end surface of each master jaw 20 facing outside in the radial direction and exposed to the outside of the chuck 1. Although neither shown in the drawing nor described in detail, the grease is injected into each grease nipple 50 using a grease gun or any other devices, and each grease nipple includes an anti-backflow mechanism not to cause backflow of the injected grease.

The grease nipples 50 communicate with the housing chamber 11 via lubricant supply paths provided in the body 10 and the master jaws 20. The lubricant supply paths are provided for the respective master jaws 20 and have the same structure. One of the lubricant supply paths will thus be described in detail.

The lubricant supply path includes an inlet hole 51, a planar recess 52, communication recesses 53, vertical holes 54, and linear recesses 55, for example. A lubricant supply mechanism includes the grease nipple 50 and the lubricant supply path.

As shown in FIGS. 7 and 9, the inlet hole 51 is open in the master jaw 20. The inlet hole 51 includes an upstream part 51a and a downstream part 51b. The upstream part 51a extends radially inward from the grease nipple 50 to a substantial center of the master jaw 20. The downstream part 51b has an opening at a substantial center of the wider sliding surface 22b and extends in the radial direction from the opening to be connected to the upstream part 51a.

As shown in FIGS. 7, 8, 11, and 13B, the planar recess 52 is formed at the center of the wider slid surface 14 of the body 10. The planar recess 52 is a shallow recess having a substantially rectangular shape in a top view and expands thinly along the wider slid surface 14.

As shown in FIG. 11, the inlet hole 51 always communicates with the planar recess 52 in the range in which the master jaw 20 slides. The upper opening of the planar recess 52 is sealed by the wider sliding surface 22b and constitutes an intermediate part of the lubricant supply path.

As shown in FIGS. 13A and 13B, the planar recess 52 is located in a region overlapping the narrower part 21 (i.e., the front slide 13a) as viewed in the axial direction. That is, as viewed in the axial direction, the recess is not formed in the region overlapping the narrower sliding surfaces 22a on both sides of the master jaw 20. The planar recess 52 in such a region can be easily formed through insertion of a general end mill into the front slide 13a of the keyway 13 and cutting of the front slide 13a.

As shown in FIGS. 9 and 10, the communication recesses 53 are open in the wider sliding surface 22b of the master jaw 20. The communication recesses 53 are circular recesses spaced apart from each other. As shown in FIG. 13A, when viewed in the axial direction, each communication recess 53 is provided in a region overlapping the narrower part 21 (i.e., the front slide 13a) and the wider part 22 (i.e., the rear slide 13b) including the boundary between these parts.

As shown in FIG. 11, a part of each communication recess 53 always communicates with the planar recess 52.

As shown in FIGS. 9, 10 and 11, two vertical holes 54 are open in the master jaw 20. Each vertical hole 54 penetrates the wider part 22 from an inlet 54a open at a portion toward the radially outer end of the narrower sliding surface 22a, substantially orthogonally to the wider sliding surface 22b. Each vertical hole 54 communicates with one of the communication recesses 53.

Such configurations of the vertical holes 54 and the communication recesses 53 reduce a decrease in the area of the contact surface in a higher load region, thereby achieving stable support of the master jaw 20.

As shown in FIGS. 10 and 13A, two linear recesses 55 are open in the master jaw 20. Each linear recess 55 is a linear groove extending in the sliding direction at a transversely intermediate part of one of the narrower sliding surfaces 22a. The radially outer end of each linear recess 55 is located in the surface of the narrower sliding surface 22a (does not penetrate the narrower sliding surface 22a) and communicates with one of the inlets 54a.

On the other hand, the radially inner end of each linear recess 55 penetrates the narrower sliding surface 22a and forms an outlet 55a communicating with the housing chamber 11. As shown in FIG. 11, the upper opening of each linear recess 55 is sealed by one of the narrower slid surfaces 15, thereby constituting a downstream part of the lubricant supply path.

Being injected from the grease nipple 50, the grease passes through the inlet hole 51 and is introduced into the planar recess 52. The grease introduced into the planar recess 52 spreads and fills the planar recess 52. Once the planar recess 52 is filled with the grease, a further injected grease is introduced into the communication recesses 53. Once the communication recesses 53 are filled with the grease, a further injected grease flows into the vertical holes 54.

The grease that has flowed into the vertical holes 54 is introduced from the inlets 54a into the linear recesses 55. A further injected grease fills each linear recess 55 and is introduced into the housing chamber 11 through the outlet 55a. The outlet 55a is the only outlet of each lubricant supply path. Thus, the grease injected in a sufficient amount fills the inlet hole 51, the planar recess 52, the communication recesses 53, the vertical holes 54, and the linear recesses 55, and is supplied also to the housing chamber 11.

Since the sliding portion between each wider sliding surface 22b and the corresponding wider slid surface 14 has the surface recess 52 and the communication recesses 53, the grease spreads in a wide range in even a large area. Similarly, the sliding portion between each narrower sliding surface 22a and the corresponding narrower slid surface 15 has the linear recess 55. The grease can thus spread in a wide range even in an elongated sliding portion.

As shown in FIGS. 9 and 10, since each outlet 55a is located at the end of the sliding part 23a of the wedge 23 where the sliding surface 24 is formed, the grease spreads to the sliding portion between the sliding surface 24 and the slid surface 42.

The sliding of the master jaws 20 in the radial direction causes the grease to spread more. The rotation of the chuck 1 generates a centrifugal force, which allows the grease that has flowed into the housing chamber 11 to flow along the surface of the wedge 23 and reach the radially outer side.

As a result, the grease stably spreads over the entire region of the sliding portions of the master jaws 20.

The chuck according to the present invention is not limited to the embodiment described above and includes various other configurations.

For example, the number of the jaws is not limited to three, and may be two, or four or more. The planar recess 52 may be formed in the wider sliding surface 22b. The linear recess 55 may be formed in the narrower slid surface 15. The communication recess 53 may be formed in the wider slid surface 14. In addition, the planar recess 52, the linear recess 55, and the communication recess 53 may be formed in both the wider sliding surfaces 22b and the wider slid surfaces 14 or both the narrower sliding surfaces 22a and the narrower slid surfaces 15.

The finishing processing is the grinding but is not limited thereto. For example, polishing or cutting may also be employed. Finishing processing allowing highly accurate processing may be employed in one preferred embodiment.

The shape of each communication recess 53 is not limited to the circle. For example, each communication recess 53 may be a pair of linear recesses (i.e., elongated grooves) extending in the circumferential or radial direction or intersecting each other (i.e., in an X shape), or may be a rectangular frame-like recess composed of continuous linear recesses extending in the circumferential and radial directions. While the chuck grasps the outside of a workpiece in the embodiment, the chuck may grasp the inside of a workpiece.

DESCRIPTION OF REFERENCE CHARACTERS

1 Chuck
10 Body
11 Housing Chamber
13 Keyway
14 Wider Slid Surface
20 Master Jaw
21 Narrower Part
22 Wider Part
22b Wider Sliding Surface
23 Wedge
40 Plunger
S Gap
J Rotation Axis

The invention claimed is:

1. A method of manufacturing a chuck including a body and a plurality of jaws, the plurality of jaws being positioned at a front surface of the body while supporting a workpiece with rotation axes of the chuck and the workpiece coinciding with each other, the chuck comprising:
a plunger arranged inside the body with a center of the plunger coinciding with the rotation axes and configured to slide in an axial direction; and
a plurality of master jaws each constituting one of the jaws and configured to slide in a radial direction in the front surface of the body in conjunction with the slide of the plunger,
wherein:
the body includes:
a plurality of keyways arranged like rays at equal intervals in the front surface and having a transverse section having a substantially inverted T-shape toward front; and
a housing chamber at a central portion of the body to communicate with the plurality of keyways, the plunger being fitted in the housing chamber,
each of the master jaws includes:
a narrower part fitted in a front portion of an associated one of the keyways and exposed to the front surface of the body;
a wider part fitted in a rear portion of the associated one of the keyways and sliding along the associated one of the keyways; and
a wedge protruding rearward from a radially inner end of the wider part and connected to the plunger,
the wider part has a flat wider sliding surface in an entire region radially outside the wedge, and each of the keyways has a wider slid surface that comes into surface contact with the wider sliding surface,
the method includes finishing processing in which the wider sliding surface is processed in a direction orthogonal to a sliding direction of the wider sliding surface,
the finishing processing makes the wider sliding surface be a smooth surface so that the wider sliding surface has high smoothness that allows the wider sliding surface to be slidable in both of the radial direction and a circumferential direction when the wider sliding surface is in surface contact with the wider slid surface.

2. The method of claim 1, wherein the wedge has a greater width than the narrower part.

3. The method of claim 2, wherein:
the plunger has, on an outer circumference of the plunger, a plurality of wedge housing grooves each having a transverse section having a substantially inverted T-shape toward radially outside and inclined so as to be closer to a radially inner side toward the front,
the wedge includes:
a sliding part fitted in a radially inner part of an associated one of the wedge housing grooves to slide along the associated one of the wedge housing grooves; and
a loosely fitting sliding part fitted in a radially outer part of the associated one of the wedge housing grooves, and
the loosely fitting sliding part is housed inside the associated one of the wedge housing grooves so as not to come out of the plunger.

4. The method of claim 3, wherein transverse ends of the sliding parts of the master jaws are arranged at substantially equal intervals in the circumferential direction.

5. The method of claim 3, wherein transverse ends of the sliding parts of the master jaws are arranged in the circumferential direction at intervals at a central angle of about 60 degrees.

* * * * *